United States Patent
Cerf et al.

(10) Patent No.: US 6,825,301 B1
(45) Date of Patent: Nov. 30, 2004

(54) WATER-IN-OIL POLYMER EMULSION AND METHOD FOR MAKING SAME

(75) Inventors: Martine Cerf, Breuil Magne (FR); Karine Triballier, Bernay (FR); Françoise Benard, Corneville la Fouquetiere (FR)

(73) Assignee: ATOFINA, Elf Atochem, S.A. (FR)

( * ) Notice: Subject to any disclaimer, the term of this patent is extended or adjusted under 35 U.S.C. 154(b) by 97 days.

(21) Appl. No.: 10/110,634

(22) PCT Filed: Sep. 6, 2000

(86) PCT No.: PCT/FR00/02454

§ 371 (c)(1),
(2), (4) Date: Sep. 12, 2002

(87) PCT Pub. No.: WO01/29092

PCT Pub. Date: Apr. 26, 2001

(30) Foreign Application Priority Data

Oct. 15, 1999 (FR) .............................. 99 12896

(51) Int. Cl.$^7$ ................ C08F 2/32; C08F 4/04
(52) U.S. Cl. .................. 526/219; 525/801; 526/204
(58) Field of Search .......................... 524/801; 526/204, 526/219

(56) References Cited

U.S. PATENT DOCUMENTS

| 3,284,393 A | 11/1966 | Vanderhoff et al. |
| 3,920,599 A | 11/1975 | Hurlock et al. |
| 4,024,097 A | 5/1977 | Slovinsky et al. |
| 4,059,552 A | 11/1977 | Zweigle et al. |
| 4,419,344 A | 12/1983 | Strasilla et al. |
| 4,713,431 A | 12/1987 | Bhattacharyya et al. |
| 5,292,800 A | 3/1994 | Moench et al. |

Primary Examiner—Kelechi C. Egwim
(74) Attorney, Agent, or Firm—Hunton & Williams LLP

(57) ABSTRACT

The invention concerns a water-in-oil polymer emulsion containing in an organic and continuous phase practically non-miscible in water, finely comminuted water soluble polymers or capable of being swollen in water, a water-in-oil emulsifying agent and optionally wetting agents. The invention also concerns a method for preparing said emulsion. More particularly, it concerns a method for invert emulsion in the presence of one or several initiators belonging a specific family of azacarboxylic acid esters.

12 Claims, No Drawings

WATER-IN-OIL POLYMER EMULSION AND METHOD FOR MAKING SAME

The present invention relates to a water-in-oil polymer emulsion containing, in a continuous and virtually water-immiscible organic phase, finely divided water-swellable or water-soluble polymers, a water-in-oil emulsifier and optionally wetting agents. The invention also relates to a process for preparing said emulsion.

Water-in-oil polymer emulsions of water-soluble polymers are known. Processes for preparing them by reverse emulsion polymerization are also known. Reference may be made to document U.S. Pat. No. 3,284,393, which is the reference patent in this field.

The process as described in U.S. Pat. No. 3,284,393 consists of emulsifying, in an organic phase, one or more water-soluble ethylenically unsaturated monomer(s), optionally in aqueous solution, using a water-in-oil emulsifier, and then in performing emulsion polymerization in the presence of an initiator. Benzoyl peroxide, lauroyl peroxide and potassium persulfate are mentioned as free-radical initiators. These peroxides have also been mentioned in U.S. Pat. No. 3,920,599.

U.S. Pat. No. 4,059,552 describes finely divided water-swellable polymers and mentions tert-butyl hydroperoxide, dimethane sulfonyl peroxide and ammonium persulfates as polymerization initiators.

It is found, however, that, in the most recent processes, azobisisobutylronitrile is most commonly used (See U.S. Pat. Nos. 4,024,097, 4,713,431, and 4,419,344) as a reverse emulsion polymerization initiator.

Moreover, U.S. Pat. No. 5,292,800 discloses water-in-oil polymer emulsion, in which the organic phase consists of at least 50% plant or animal oils. Comparative Example 1 of said patent shows that, by polymerizing at 55° C., 250 g of an aqueous 50% solution of acrylamide in 250 g of rapeseed oil in the presence of dimethyl 2,2'-azobis (isobutyrate) as initiator and using a commercial sorbitan monooleate as an emulsifier, a granular and unfiltrable water-in-oil polymer emulsion is formed.

Applicants have now developed a process for preparing a stable reverse emulsion having an organic phase of less than 50% by weight. In addition, it makes it possible to reduce or even eliminate the problems of formation of coagulates or of grains that are encountered during the polymerization. This process also makes it possible to prepare polymers with high molecular masses, this property being particularly advantageous for increasing their efficacy in applications such as flocculation, etc.

The process, according to the present invention, comprises emulsifying, in an organic phase, one or more ethylenically unsaturated monomer(s), using a water-in-oil emulsifier and then performing an emulsion polymerization, wherein the polymerization is performed in the presence of one or more initiator(s) belonging to the family of azocarboxylic acid esters, represented by formula (I).

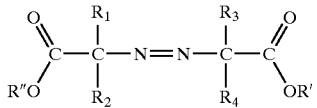

(I)

in which:
$R_1$, $R_2$, $R_3$ and $R_4$, which may be identical or different, are selected independently from the group consisting of linear or branched-alkyls containing from 1 to 9 carbon atoms are preferably from 1 to 4 carbon atoms, optionally substituted with one or more substituents selected from hydroxyl, $C_1$ to $C_6$ alkoxy and halogen substituents; $C_3$ to $C_{12}$-cycloalkyls, optionally substituted with one or more substituents selected from $C_1$ to $C_6$ alkyl, $C_1$ to $C_6$ alkoxy, hydroxyl and halo groups;

-aralkyls optionally substituted with one or more $C_1$ to $C_6$ alkyl, $C_1$ to $C_6$ alkoxy, hydroxyl and halo groups;

-aryls optionally substituted with one or more substituents selected from $C_1$ to $C_6$ alkyl, $C_1$ to $C_6$ alkoxy, hydroxyl and halo groups;

with at least one of the combinations $R_1$–$R_2$ and $R_3$–$R_4$ possibly forming an aliphatic ring; R" and R' are identical to or different than each other and are selected independently from the group consisting of linear or branched $C_1$ to $C_{10}$ and preferably $C_1$ to $C_4$ aliphatic radicals.

The advantage of these azocarboxylic acid esters is their low melting point, which is generally less than 27° C. The preferred azocarboxylic acid esters are those in which R" and R' represent methyl or ethyl and in which $R_1$, $R_2$, $R_3$ and $R_4$ advantageously represent $C_1$ to $C_4$ alkyl groups.

The azocarboxylic acid ester that is particularly preferred is diethyl 2,2'-azobisisobutyrate, that is to say with $R_1$, $R_2$, $R_3$ and $R_4$ representing methyl and R' and R" representing ethyl. DEAB may also be used as a mixture with other azocarboxylic acid esters. Mention may be made, for example, of mixtures of diethyl 2,2'-azobisisobutyrate (DEAB) and of dimethyl 2,2'-azobisisobutyrate (DMAB) with a mass content of DEAB of greater than 50%, and mixtures of DEAB, DMAB and 2-methyl 2'-ethyl azobisisobutyrate with a $COOCH_3/COOC_2H_5$ molar ratio $\leq 10$.

The azocarboxylic acid esters of formula (I) may be prepared by a standard two-step process comprising a first step of converting the azonitrile, by reaction with an alcohol, in the presence of HCl, according to the Pinner reaction, leading to the corresponding azoimino ether hydrochloride, and a second step of hydrolysis in the presence of the hydrochloride thus obtained. They may also be prepared by the improved processes as described in documents DE 2 254 575, EP 80 275 and EP 230 586.

In addition, these esters may be prepared by reacting an azonitrile with an alcohol and hydrochloric acid in an aromatic solvent, with an HCl/azonitrile molar ratio >2 when the alcohol is methanol and >3 when the alcohol is ethanol or a higher alcohol.

The amount of azocarboxylic acid esters used in the process according to the present invention represents about 0.01 to 1% by weight of the ethylenically unsaturated monomer(s) used and preferably 0.02% to 0.5% by weight.

The water-soluble ethylenically unsaturated monomers or the mixtures of water-soluble monomers, comprising water-soluble ethylenically unsaturated monomers and water-insoluble ethylenically unsaturated monomers, are preferred.

Water-soluble ethylenically unsaturated monomers that may especially be mentioned include unsaturated monoethylenic carboxylic acids, for instance acrylic acid, methacrylic acid, maleic acid, itaconic acid, and salts of the abovementioned carboxylic acids, for example the sodium, potassium or ammonium salts, esters or acrylic acid and methacrylic acid and of amino alcohols such as, for example, dimethylaminoethyl acrylate, in protonated or quaternized form, for example dimethylaminoethyl acrylate hydrochloride, dimethylaminoethyl acrylate hydrogen sulfate or bisulfate, dimethylaminoethyl acrylate methyl chloride, dimethylaminoethyl acrylate methyl sulfate, dimethylaminoethyl methacrylate hydrochloride, dimethylaminoethyl methacrylate hydrogen sulfate or bisulfate, dimethylaminoethyl methacrylate methyl chloride, dimethylaminoethyl methacrylate methyl sulfate, acrylamide, methacrylamide, N-alkyl(meth)acrylamides, methacrylamidopropyltrimethylammonium chloride, acrylamidopropyltrimethylammonium chloride, methacrylamidopropyltrimethylammonium methyl sulfate, acrylamidopropyltrimethylammonium methyl sulfate, acrylamido- and methacrylamidoalkylsulfonic acids and salts thereof, such as 2-acrylamido-2-methylpropanesulfonic acid, hydroxyalkyl acrylates and hydroxyalkyl methacrylates, vinylsulfonic acid, vinylphosphonic acid, N-vinylamides such as, for example, N-vinyl-formamide, N-vinylacetamide, N-vinyl-N-methylacetamide and N-vinyl-N-methylformamide, diallyldimethylammonium chloride, N-vinylpyrrolidone, N-vinylimidazole, N-vinylimidazoline, 2-methyl-1-vinylimidazoline, 2-ethylsulfonic methacrylic acid, styrenephosphonic acid and styrene sulfonic acid. Mention may also be made of N-methylolacryamide and N-methylolmethacrylamide, and also of N-methylol(meth)acrylamides which are partially or totally etherified with monohydroxylated $C_1$ to $C_4$ alcohols.

These monomers may be cationic or anionic and, in certain cases, the ionic charges are small enough for the monomers to be considered as nonionic.

The cationic monomers are, for example, allylic amines or diallylic amines or dimethylaminoethyl methacrylate or quaternary salts such as ethyltrimethylammonium acrylate chloride, ethyltrimethylammonium methacrylate chloride, acrylamidopropyltrimethylammonium chloride and diallyldimethylammonium chloride.

The anionic monomers are, for example, acrylic acid or methacrylic acid, 2-(meth)acrylamido alkylsulfonic acid and salts thereof, vinyl phosphonic acid, styrene sulfonic acid and styrene phosphonic acid.

The water-soluble mixture of monomers that is particularly suitable for the invention consists of acrylamide and of at least one monomer chosen from ethyltrimethylammonium acrylate chloride, ethyltrimethylammonium methacrylate chloride, acrylamidopropyltrimethylammonium chloride, diallyldimethylammonium chloride, acrylic acid and methacrylic acid.

The organic phase consists of an inert hydrophobic liquid and generally represents between 10% and 49% of the total weight of the emulsion and preferably between 20% and 40%.

The inert hydrophobic liquid may be chosen from a wide range of organic liquids comprising liquid hydrocarbons and substituted liquid hydrocarbons, preferably containing from 4 to 8 carbon atoms or even more than 8 carbon atoms. For example benzene, xylene, toluene, mineral oils, kerosene, heavy spirits and, in certain cases, petroleum can be used. Petroleum fractions and in particular in branched-chain isoparaffinic fraction sold under the brand name "Isopar M" have been found to be particularly advantageous.

The water-in-oil emulsifier that are suitable are those with an HLB (hydrophilic-lipophilic balance) value between 2 and 10 and preferably between 3 and 9. For the definition of the HLB value, reference may be made to the article by W. C. Griffin in Journal of Society of Cosmetic Chemist, Volume 1, 311 (1950).

Examples that may be mentioned include fatty acid esters of mono-, di- and polyglycerols, for instance the monoleate, the dioleate, the monostearate, the distearate and the palmitostearate. These exters may be prepared, for example, by esterifying mono-, di- and polyglycerols, or mixtures of polyhydroxylated alcohols such as ethylene glycol, diethylene glycol, dipropylene glycol, 1,4-butanediol, 1,2,4-butanetriol, glycerol, trimethylolpropane, sorbitol, neopentyl glycol and pentaerythritol.

In addition, mention may be made of fatty acid esters of sorbitan, for instance sorbitan monoleate, sorbitan dioleate, sorbitan trioleate, sorbitan monostearate and sorbitan tristearate.

Fatty acid esters of mannitol, for instance mannitol monolaurate or mannitol monopalmitate, fatty acid esters of pentaerythritol, for instance pentaerythritol monomyristate, pentaerythritol monopalmitate and pentaerythritol dipalmitate, fatty acid esters of polyethylene glycol sorbitan, more particularly the monooleates, fatty acid esters of polyethylene glycol mannitol, more particularly the monooleates and triolates, fatty acid esters of glucose, for instance glucose monooleate and glucose monostearate, trimethylolpropane distearate, the products of reaction of isopropylamide with oleic acid, fatty acid esters of glycerol sorbitan, ethoxylated alkylaines, sodium hexadecyl phthalate and sodium decyl phthalate may also be suitable as emulsifiers.

The polymerization temperature depends on the decomposition kinetics of the initiator used and is generally between 10 and 100° C. and preferably between 30 and 90° C.

According to the process of the present invention, the process is preferably performed in the absence of oxygen. A flow of inert gas such as nitrogen or argon may be used to purge the installation. It has been found that, in the absence of oxygen in the reaction medium, the polymers obtained are reproducible, the molar masses are higher and the content of residual monomer is lower.

The process of the present invention also has the advantage of not leading to the formation of toxic byproducts.

The polymers thus obtained may be used as flocculants in the purification of urban and industrial waste water, in the paper industry, in mines, quarries and drilling muds, in the assisted recovery of petroleum, and in the treatment of drinking water.

EXPERIMENTAL SECTION

Isopar M: Paraffinic hydrocarbon from Exxon
Span 80: Sorbitan monooleate from ICI
Tween 61: Polyethoxylenated sorbitan monostearate (4 mol of PEO) from ICI
AZDN: 2,2'-azobisisobutyronitrile sold by Elf Atochem
DMAB: Dimethyl 2,2'-azobisisobutyrate
DEAB: Diethyl 2,2'-azobisisobutyrate
EDTA: Ethylene diaminetetraacetic acid.

The amount indicated in the general procedure corresponds to 100 grams of monomers used.

General Procedure

Preparation of the aqueous phase:
The following products are successively introduced into a beaker with stirring:

| | |
|---|---|
| demineralized water | 176.35 g |
| acrylamide (50% in water) | 335.91 g |
| Adamquat MC-80 | 50.00 g |
| EDTA | 0.08 g |
| adipic acid | 12.60 g |
| NaOH (50% in water) | 1.68 g |
| NaCl | 12.60 g |

Preparation of the oil phase:
The following products are successively introduced into a 1 liter Wolff flask:

| Isopar M | 218.67 g |
| --- | --- |
| Span 80 | 18.60 g |
| Tween 61 | 2.20 g |

Preparation of the monomer emulsion:

The aqueous phase prepared above is poured into the oil phase. The two phases are homogenized using an Ultra-Turrax blender for 2 minutes.

Polymerization reaction:

The monomer emulsion obtained above is poured into a polymerization reactor equipped with a twin turbomixer set at 500 rpm, a condenser and a dipped tube fed with nitrogen. This emulsion is then maintained for 30 minutes under a nitrogen sparge and is brought to 47° C. The azo initiator (0.15 part) is then introduced while maintaining the temperature of the reaction medium at 47° C.±2° C. for 2 hours 30 minutes. A steady temperature of 52.5° C. is then maintained for 1 hour, followed by a second steady temperature of 80° C. also for 1 hour. The reaction medium is then cooled to room temperature and transvased by filtering the mixture the mixture through a 10 μm filter. The amount of grains possibly formed is measured after drying in an oven for 24 hours at 40° C. The content of the grains is calculated by determining the ratio of the amount of grain obtained and of the theoretical amount of polymer formed.

The intrinsic viscosity of the polymers isolated by precipitation of 10 g of reverse emulsion in 100 g of acetone is measured. The polymer then being taken up in 300 ml of acetone to give a powder which is dried for 24 hours in an oven at 40° C.

0.5 g of copolymer is dissolved in 200 ml of an aqueous molar NaCl solution. This solution is rediluted several times and the corresponding kinematic viscosities are measured each time. The intrinsic viscosity may then be determined.

| EXAMPLES | 1 | 2 | 3 |
| --- | --- | --- | --- |
| Initiator | AZDN | DMAB | DEAB |
| Grain content | 3.7% | 0% | 0% |
| Intrinsic viscosity (dg/l) | 12.7 | 15 | 12.5 |

EXAMPLE 4

The reaction is performed as described above, but maintaining a polymerization steady temperature of 45° C. instead of 47° C. and using DMAB as initiator.

| EXAMPLE | 5 |
| --- | --- |
| Initiator | DMAB |
| Grain content | 0% |
| Intrinsic viscosity (dg/l) | 17 |

What is claimed is:

1. A process for preparing a water-in-oil polymer emulsion, said process comprising emulsifying, in an organic phase, at least one ethylenically unsaturated monomer, using a water-in-oil emulsifier and performing an emulsion polymerization;

wherein said polymerization is performed in the presence of at least one initiator of formula

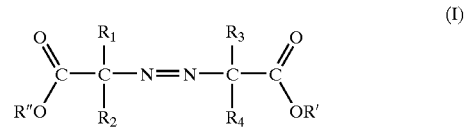

(I)

wherein $R_1$, $R_2$, $R_3$ and $R_4$ each independently comprise:
(i) linear or branched-alkyl group containing from 1 to 9 carbon atoms, wherein said -alkyl group is optionally substituted with at least one hydroxyl group, $C_1$ to $C_6$ alkoxy group, halogen group, or a combination thereof;
(ii) $C_3$ to $C_{12}$-cycloalkyl group, wherein said -cycloalkyl group is optionally substituted with at least one $C_1$ to $C_6$ alkyl group, $C_1$ to $C_6$ alkoxy group, hydroxyl group, halo group, or a combination thereof;
(iii) an -aralkyl group, wherein said -aralkyl group is optionally substituted with at least one $C_1$ to $C_6$ alkyl group, $C_1$ to $C_6$ alkoxy group, hydroxyl group, halo group, or a combination thereof;
(iv) an -aryl group, wherein said -aryl group is optionally substituted with at least one $C_1$ to $C_6$ alkyl group, $C_1$ to $C_6$ alkoxy group, hydroxyl group, halo group, or a combination thereof;

wherein, optionally, at least one combination of $R_1$–$R_2$ and/or $R_3$–$R_4$ form an aliphatic ring; and wherein R" and R' independently comprise linear or branched $C_1$ to $C_{10}$ aliphatic radicals.

2. The process of claim 1, wherein said linear or branched alkyl group contains from 1 to 4 carbon atoms.

3. The process of claim 1, wherein said R" and R' independently comprise linear or branched $C_1$ to $C_4$ aliphatic radicals.

4. The process of claim 1, wherein R" and R' comprise methyl or ethyl groups and $R_1$, $R_2$, $R_3$ and $R_4$ comprise a $C_1$ to $C_4$ alkyl radical.

5. The process of claim 4, wherein R" and R comprise an ethyl radical and $R_1$, $R_2$, $R_3$ and $R_4$ comprise a methyl radical.

6. The process of claim 1, wherein at least one of said initiator is diethyl 2,2'-azobisisobutyrate.

7. The process of claim 6, wherein said process comprises more than one initiator of formula (I) and at least one of said initiator is diethyl 2,2'-azobisisobutyrate.

8. The process of claim 1, wherein said process is performed in the absence of oxygen.

9. The process of claim 1, wherein said process comprises a polymerization temperature of between about 10° C. and about 100° C.

10. The process of claim 9, wherein said polymerization temperature is between about 30° C. and about 90° C.

11. The process of claim 1, wherein said organic phase comprises an inert hydrophobic liquid.

12. A water-in-oil polymer emulsion prepared by emulsifying, in an organic phase, at least one ethylenically unsaturated monomer, using a water-in-oil emulsifier and performing an emulsion polymerization;

wherein said polymerization is performed in the presence of at least one initiator of formula

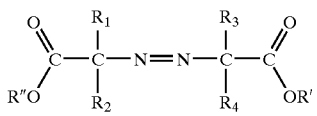 (I)

wherein $R_1$, $R_2$, $R_3$ and $R_4$ each independently comprise:
(i) a linear or branched-alkyl group containing from 1 to 9 carbon atoms, wherein said -alkyl group is optionally substituted with at least one hydroxyl group, $C_1$ to $C_6$ alkoxy group, halogen group, or a combination thereof;
(ii) a $C_3$ to $C_{12}$-cycloalkyl group, wherein said -cycloalkyl group is optionally substituted with at least one $C_1$ to $C_6$ alkyl group, $C_1$ to $C_6$ alkoxy group, hydroxyl group, halo group, or a combination thereof;
(iii) an -aralkyl group, wherein said -aralkyl group is optionally substituted with at least one $C_1$ to $C_6$ alkyl group, $C_1$ to $C_6$ alkoxy group, hydroxyl group, halo group, or a combination thereof; or
(iv) an -aryl group, wherein said -aryl group is optionally substituted with at least one $C_1$ to $C_6$ alkyl group, $C_1$ to $C_6$ alkoxy group, hydroxyl group, halo group, or a combination thereof;

wherein, optionally, at least one combination of $R_1$–$R_2$ and/or $R_3$–$R_4$ form an aliphatic ring; and
wherein R" and R' independently comprise linear or branched $C_1$ to $C_{10}$ aliphatic radicals.

\* \* \* \* \*